United States Patent [19]  [11] 4,008,399
Brown  [45] Feb. 15, 1977

[54] GAMMA COMPENSATED, SELF POWERED NEUTRON DETECTOR

[75] Inventor: Donald P. Brown, Richland, Wash.

[73] Assignee: The United States of America as represented by the United States Energy Research and Development Administration, Washington, D.C.

[22] Filed: June 13, 1975

[21] Appl. No.: 586,698

Related U.S. Application Data

[63] Continuation of Ser. No. 440,232, Feb. 6, 1974, abandoned.

[52] U.S. Cl. .............................. 250/390; 250/370; 250/392

[51] Int. Cl.² .......................................... G01T 3/00

[58] Field of Search .................. 250/390, 392, 370

[56] References Cited
UNITED STATES PATENTS

| | | | |
|---|---|---|---|
| 3,067,329 | 12/1962 | Linden | 250/370 |
| 3,375,370 | 3/1968 | Hilborn | 250/370 |
| 3,390,270 | 6/1968 | Treinen et al. | 250/390 |
| 3,400,289 | 9/1968 | Anderson | 250/390 |
| 3,760,183 | 9/1973 | Neissel | 250/390 |
| 3,898,466 | 8/1975 | Kawashima | 250/392 |

Primary Examiner—Harold A. Dixon
Attorney, Agent, or Firm—D. C. Abeles; Z. L. Dermer

[57] ABSTRACT

An improved, self-powered, gamma compensated, neutron detector having two electrically conductive concentric cylindrical electrodes and a central rod emitter formed from a material which emits beta particles when bombarded by neutrons. The outer electrode and emitter are maintained at a common potential and the neutron representative current is furnished at the inner cylindrical electrode which serves as a collector. The two concentric cylindrical electrodes are designed to exhibit substantially equal electron emission induced by Compton scattering under neutron bombardment to supply the desired gamma compensation.

11 Claims, 3 Drawing Figures

GAMMA COMPENSATED, SELF POWERED NEUTRON DETECTOR

This is a continuation of application Ser. No. 440,232 filed Feb. 6, 1974 now abandoned.

BACKGROUND OF THE INVENTION

The invention described herein was made in the course of, or under, a contract with the United States Atomic Energy Commission and pertains generally to self-powered neutron detectors and more particularly to such detectors that have internally designed gamma compensation.

A variety of self-powered detectors presently exist for the measurement of reactor thermal neutrons. The large thermal neutron cross sections result in easily measured signal currents with minor contributions from gamma induced currents. As attention focused on an application of self powered techniques to the measurement of fast neutrons, reduced neutron cross sections resulted in greater relative contributions of the interfering gamma induced currents. Accordingly, in order to provide a representative fast neutron detector output, a method or technique is required which will effectively eliminate or significantly reduce the gamma current contributions.

Presently, in analogous state of the art devices, compensation for gamma induced currents is achieved by introducing a second detection device responsive only to the gamma effects. The neutron caused and gamma caused currents are then combined in a summing network to provide a measurement of the desired parameter (neutron representative current). This compensation technique necessitates the use of a two conductor shielded cable and generally requires a complex and difficult to fabricate structure.

One example of prior art devices can be found in the patent to Hilborn U.S. Pat. No. 3,375,370, which accomplishes gamma compensation by using two identical detectors, one of which is sensitive only to gammas. Currents generated by the two detectors are summed at the input to a differential current meter so that only the neutron induced current is indicated. A second example can be found in the patent to Linden U.S. Pat. No. 3,067,329, which provides gamma compensation in a manner similar to the Hilborn method except that the two detectors are constructed concentrically instead of separately. The Linden method requires two separate cables or a twin conductor cable coupled to current summing equipment to balance out the gamma induced current.

Preferably, a structural arrangement is desired for fast neutron, self-powered detectors, which enables direct, internal cancellation of gamma induced currents and eliminates the need for two coaxial cables or for twin conductor cables at the detector output. Desirably, measurements should be made with one single ended output current lead.

SUMMARY OF THE INVENTION

Briefly, this invention provides an improved, self-powered, neutron detector having an integral structure which inherently provides gamma compensation. Gamma interaction with the detector materials is nullified at the collector through direct cancellation of the currents induced by Compton scattered electrons.

In its preferred form this is accomplished by providing a detector having two electrically isolated concentric electrodes with a centrally positioned emitter formed from a material which emits beta particles in a field of neutron bombardment. The central emitter and outer electrode are maintained at a common potential while the intermediate concentric electrode, which serves as a collector, is electrically insulated from the other detector components. The beta responsive current is read across the common and collector potentials and is available for transmission by a single coaxial connecting cable. Collector absorbed electrons resulting from gamma particle bombardment of the outer electrode are directly cancelled by the generation of an equal and opposite current induced by Compton scattered electrons that result from gamma interaction with the collector materials.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

The source of gamma induced current in a self-powered detector is complex. However, the primary cause is due to Compton electrons scattered towards the emitter. The movement of these charges between the inner and outer conductors of a normal coaxial assembly constitutes the gamma induced current, which combines with the neutron representative beta current to provide a non-representative signal at the detector output. Some form of compensation is required as previously set forth to normalize the total detector output current to the current induced by gamma interaction with the detector materials.

Figure 1:
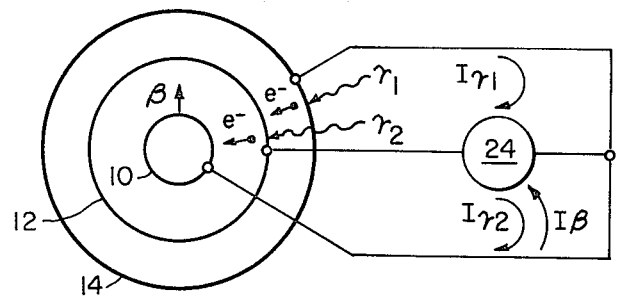
FIG. 1 is a schematic diagram illustrating the basic operation of the detector of this invention.

In accordance with this invention a structural variation is employed which supplies a second cylindrical concentric electrode in a triaxial design which makes it possible to generate two equal but opposing gamma induced currents at the detector output as illustrated in FIG. 1.

Figure 2:
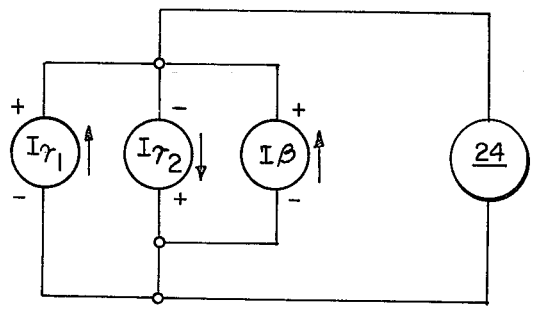
FIG. 2 is an equivalent circuitry diagram illustratively showing the gamma and beta induced currents generated by the detector of FIG. 1; and, FIG. 3 is a sectional view of the detector of FIG. 1 illustrating the basic construction thereof.

Referring to FIG. 1 of the drawings it will be appreciated that a central rod emitter 10 is provided, constructed of a material that is responsive to neutron bombardment to provide a representative beta current output. A concentric cylindrical electrode 12 is positioned coaxially around the center electrode 10 and serves as a collector to absorb the beta current generated at the emitter. A second current $I_{\gamma 2}$ is concurrently generated at the collector, induced from the gamma interaction with the collector materials, which provides an electron flow between the collector and the emitter. To cancel the effect of this second current a second cylindrical electrode 14 is positioned concentrically around the collector. The second electrode 14 is designed to generate a gamma, induced current output $I_1$ substantially equal to $I_{\gamma 2}$. Note, that the current generated by beta ($\beta$) particles emitted at the center emitter ($I\beta$) constitutes the desired measurement parameter. With the central emitter 10 and outer conductor 14 maintained at a common potential, direct cancellation of the gamma induced currents will occur at the collector interface. The equivalent electrical analog is illustrated in the circuit of FIG. 2 which shows that direct current cancellation enables the use of a simple coaxial cable to connect the sensor to the readout instrumentation.

Figure 3:
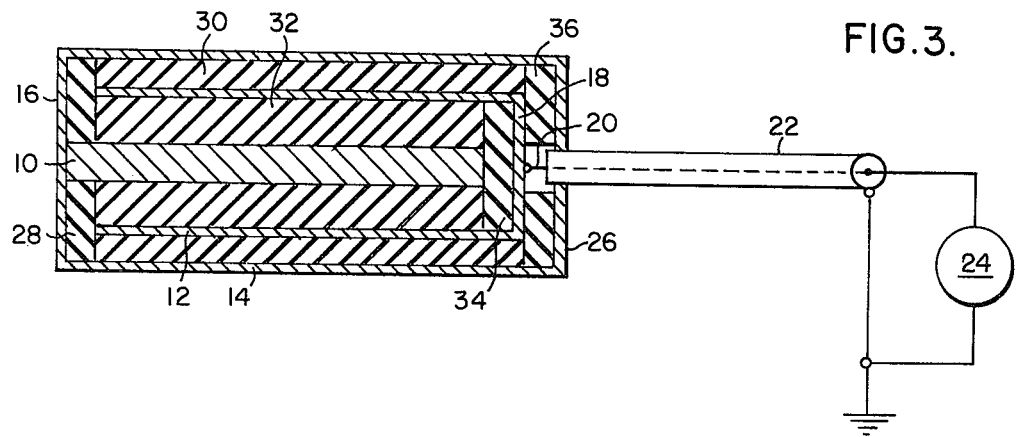

FIG. 3 is a cross sectional view showing the actual construction of the preferred form of the detector of this invention. The sensor basically is formed from two cylindrical electrodes 12 and 14 constructed from a material such as stainless steel, a central rod emitter 10 constructed of a material such as beryllium ($^9Be$), and cylindrical and disc insulators. The beryllium rod emitter provides the $^9Be\ (n,\alpha)^6He$ reaction with neutrons exceeding about 0.67/MeV in energy. The generated $^6He$ decays by beta emission with an 0.81 second half life. These betas emitted from the rod move toward the collector, thus causing a current to flow into the external circuit. The rod 10 is electrically coupled to the outer stainless steel sheath 14 through an electrically conducting base plate 16 which establishes a common potential between the central emitter and outer electrode. The second cylindrical electrode 12 is supported between and insulated from the outer electrode 14 and the central emitter 10. Electrical communication is established at the end plate 18 of the collector to the central conductor 20 of the coaxial connecting cable 22 for transmission to the readout electronics shown schematically as a meter 24. The ground connection of the coaxial cable is coupled to the end cover 26 of the outer electrode to establish the common potential across the outer electrode and central emitter. Insulation is maintained between the several components of the detector unit by the plurality of insulating washers 28, 30, 32, 34 and 36 formed from a material such as MgO or $Al_2O_3$. The specific design illustrated provides a compact durable structure that is relatively easy to fabricate. Compton electrons generated in the outer sheath 14 move towards the collector and compensate for the Compton electrons generated at the collector which move away from the collector towards the beryllium rod. The sheath, collector, and insulator thicknesses are chosen for proper current generation rates and for complete absorption of Compton electrons and beta particles.

Thus, the structure of this invention provides direct cancellation of gamma induced currents and allows the use of a simple coaxial cable to connect the detector to the measurement equipment. This is extremely desirable in a reactor application wherein the detectors are located in the reactor environment and the measurement equipment is located external to the reactor containment in a separate control room.

What is claimed is:

1. An improved, self-powered, gamma compensated, neutron detector comprising:
   an emitter constructed from a material which is responsive to neutron bombardment to provide a beta emission with a representative intensity corresponding to the intensity of the neutron bombardment;
   an electrically conductive sheath positioned concentrically around said emitter;
   means for maintaining said emitter and sheath at a common potential;
   an electrically conductive collector positioned concentrically around said emitter, arranged between said sheath and emitter and electrically insulated therefrom, said sheath is constructed to provide an intensity of Compton scattered electron emissions as a result from gamma interaction with the sheath materials that will impart in the collector a current substantially equal and opposite in magnitude to the net gamma induced current imparted in the collector as a result of Compton scattered electron emissions from the collector materials; and
   an electrical connector having a first electrical conductor coupled to said collector and insulated from said sheath and emitter, and a second electrical conductor communicating with said emitter and sheath.

2. The detector of claim 1 wherein said emitter and sheath are grounded.

3. The detector of claim 1 wherein said emitter is responsive to neutrons exceeding approximately 0.67 MeV in energy to provide a representative beta emission.

4. The detector of claim 3 wherein said emitter comprises a beryllium rod.

5. The detector of claim 4 wherein the beta emission is a product of a $^9Be(n,\alpha)^6He$ reaction with neutrons.

6. The detector of claim 1 wherein said collector and sheath are constructed from stainless steel.

7. The detector of claim 1 wherein: said sheath is constructed in the form of an elongated tubular housing having one end closed by a base plate formed from an electrically conductive material; said emitter is electrically coupled at one end to the central region of the base plate and longitudinally extends therefrom along the axis of said sheath; said collector is formed in the shape of an elongated tubular housing sized to be spaced from while arranged between said sheath and said emitter, and is positioned in electrical isolation thereto with the tubular end termination of said collector opposite said base plate closed by an end plate of electrically conductive material arranged to be insulated from said emitter and said sheath while enclosing said emitter within the central opening of said collector; the tubular end termination of said sheath opposite the base plate is closed by a top cover having a central opening sized to provide access for external electrical connection to the collector enclosed therein; and the remainder of the space between said collector and said emitter, and said collector and said sheath is secured with electrical insulation.

8. The detector of claim 7 wherein external electrical contact is provided at the end plate of said collector through the central opening in the top cover of said sheath and at the top cover of said sheath.

9. The detector of claim 1 wherein said means for maintaining said emitter and sheath at a common potential is an electrical shunt communicating therebetween.

10. The detector of claim 1 wherein said collector, emitter and sheath are sized to be arranged substantially co-extensive with each other.

11. The detector of claim 1 wherein said sheath is constructed to provide an intensity of Compton scattered electron emissions as result from gamma interaction with the sheath materials that will impart in the collector a current substantially equal and opposite in magnitude to the net gamma induced current imparted in the collector as a result of Compton scattered electron emissions from the collector, emitter and electrical connector materials.

* * * * *